US006342750B1

(12) United States Patent
Braungardt et al.

(10) Patent No.: US 6,342,750 B1
(45) Date of Patent: Jan. 29, 2002

(54) VIBRATION DRIVE FOR A MOLD

(75) Inventors: Rudolf Braungardt, Lengenfeld; Erwin Schmucker, Schelklingen, both of (DE)

(73) Assignee: KOBRA Formen-und Anlagenbau GmbH, Lengenfeld (DE)

( * ) Notice: Subject to any disclaimer, the term of this patent is extended or adjusted under 35 U.S.C. 154(b) by 0 days.

(21) Appl. No.: 09/564,035

(22) Filed: May 4, 2000

(51) Int. Cl.[7] .................................................. H02N 2/00
(52) U.S. Cl. ................................... 310/323.18; 310/328
(58) Field of Search ............................. 310/323.18, 328

(56) References Cited

U.S. PATENT DOCUMENTS 4,836,684 A * 6/1989 Javorik et al. .............. 366/114
5,441,062 A * 8/1995 Nogues .................. 134/122 R
5,520,862 A * 5/1996 Face et al. ................. 264/40.1
5,527,175 A * 6/1996 Face et al. .................. 425/135
5,814,232 A * 9/1998 Face et al. .................. 210/739
5,994,818 A * 11/1999 Abramov et al. ........... 310/325
6,101,880 A * 8/2000 Face et al. ..................... 73/579
6,119,804 A * 9/2000 Owen ......................... 181/113

* cited by examiner

*Primary Examiner*—Thomas M. Dougherty
(74) *Attorney, Agent, or Firm*—Edmund M. Jaskiewicz

(57) ABSTRACT

The vibration drive for a mold for producing concrete mold bodies has four piezoelectric vibration exciters which are located in the four corner areas of a vibrating table of a molding machine and connected to the machine frame. A vertically movable mold with several mold cavities which are open to the top and bottom is deposited on the vibrating table. After filling the mold cavities with concrete, the vibration exciters are activated and are caused to vibrate by shaking, these vibrations being transferred to the vibrating table and the mold. The vibration exciters are electrically connected to a microprocessor which controls the vibration frequency and other parameters of the vibration drive by corresponding, preselectable computer programs.

19 Claims, 7 Drawing Sheets

VIBRATION DRIVE FOR A MOLD

BACKGROUND OF THE INVENTION

The present invention relates to a vibration drive for a machine for producing shaped concrete bodies from a mold which is placed on a vibrating table and filled with flowable concrete, more particularly, to such a vibration drive utilizing one or more piezoelectric vibration exciters connecting a vibrating table to the frame of the machine.

In such vibration drives, cam and eccentric motors have generally been used in order to cause the vibrating table of the molding machine to vibrate. As a result, the mold which is open at the top and bottom and which is positioned on the vibrating table is similarly caused to vibrate and shaken in order to compact the concrete mass which has been placed in the mold cavities as uniformly as possible. During the shaking process, the opened top of the mold is generally closed using vertically movable pressure plates which move downwardly from overhead into the mold cavities and press on the concrete mass.

The disadvantage in such known structures is that the mechanical eccentric motors provide largely uncontrolled shakey movements which can lead to damage and premature wear phenomena of the mold. Therefore, the mold and the vibrating table must be built to be very strong and is thus more complex. In addition, the mold machine and the mold are often not optimally matched to one another with respect to vibration engineering. The same also applies to the concrete mass which has been placed in the mold and which, depending on the type, volume, grain size, moisture content, specific weight and other properties requires different vibration parameters such as vibration frequency, vibration duration, vibration path, vibration direction and others. These discrepancies of matching leads to nonuniform filling of the mold cavities and to nonuniform compaction of the concrete mass within the mold. As a consequence thereof, the finished moldings are of relatively poor quality. Also, the molds which must be made thicker and the relatively heavy vibrating table also require much higher vibration energy.

The German published patent application DE OS 38 37 686 discloses a three-dimensional vibration system in which a mold which is filled with a concrete mass is kept in resonant vibration to produce the concrete mold bodies. The mold is supported by bearing springs on the machine frame and is caused to vibrate by means of vibration exciters in the form of eccentric motors. Sensors indicate various parameters such as the stiffness and damping of the bearing springs and the resonant frequency of the vibration system is measured and monitored in a microprocessor. When the resonant frequency is exceeded or not attained, a corresponding correction occurs by changing the bearing spring parameters in order to keep the vibration system at the desired resonant frequency. In this manner, optimum vibration conditions will be created with low input power.

This known prior art structure which has not yet been put into practice has the disadvantage that conventional mechanical eccentric motors are always used as the vibration exciters, but they are not especially well-suited to the control of the exciter frequency. The additional construction which is required to control the exciter frequency by changing the bearing spring parameters is very considerable. At the beginning and end of the shaking process the mechanical eccentric motor traverses a rpm. range from zero to maximum and back again. In so doing, the individual components or groups of components are briefly excited to the natural frequency. This results in damage and additional noise.

Further, the cycle time of the molding machine is considerably lengthened.

SUMMARY OF THE INVENTION

It is the principal object of the present invention to provide a novel and improved vibration drive for a machine for producing shaped concrete bodies from a mold.

It is another object of the present invention to provide such a vibration drive which can be readily adjusted according to the various requirements of practice in order to ensure optimum vibration behavior of the mold and thus high quality of the final product.

The objects of the present invention are achieved and the disadvantages of the prior art as described above are overcome by the vibration drive of the present invention which has at least one piezoelectric vibration exciter with a stationary portion which is connected to the machine frame and a vibrating member which is connected to the vibrating table.

In order to directly transmit vibrations, a vibrating member of the vibration exciter is connected to a piezoelement through a transducer which may comprise a hydraulic fluid. The piezoelement is clamped in the stationary portion of the vibration exciter so as to be able to vibrate freely. A first or larger piston is connected to the piezoelement and vibrations are transmitted through a hydraulic fluid to a second or smaller piston which is attached to the vibrating member of the vibration exciter. Downward or return movement of the second piston can be enhanced by a return spring. The piezoelement may be a ceramic.

In order to achieve a simple, vertical shaking motion of the mold in one embodiment there is provided one vibration exciter in each of the four corner areas of the rectangular vibrating table and each exciter has a vertical vibration direction.

Another modification of the present invention provides for three-dimensional vibration of the mold and different directions of vibration. This is achieved by mounting a vibration exciter in each of the four corner areas of the vibrating table but with the longitudinal or vibration axis of each exciter being at an angle with the vertical which angle is preferably 45 degrees. It is preferable that the vibration exciters are connected by spherical bearings to the vibrating table and/or the machine frame. These spherical bearings preferably consist of ball- and socket joints.

A further modification of the present vibration drive can be applied to a molding machine having pressure plates which correspond to the mold cavities and which can be moved vertically by lifting elements from overhead to press on the concrete mane in the mold cavities. To reinforce the vibratory motion one or more vibration exciters may be interconnected between the pressure plate lifting elements and the pressure plates. As a result, an additional vibratory or shaking motion is applied through the pressure plates to the concrete mass and the distribution and compaction of the concrete mass and the mold cavities are significantly improved.

In order to obtain optimum vibratory action under different operating conditions, parameters of the vibration drive such as the vibration frequency, vibration duration, vibration path, vibration direction and the number of activated vibration exciters can be varied. This can be accomplished by connecting the vibration exciters to a microprocessor which contains one or more preselectable programs for adjusting the required parameter quantities of the vibration drive. The vibration exciters can be activated or controlled individually or in predetermined groups.

The advantages and results achieved with the present vibration drive is that the utilization of the piezoelectric vibration exciters enables one to vary the vibration drive with different operating conditions, depending on the product, and characteristics of the concrete mass to result in a high quality bolded concrete body. The use of the piezoelectric vibration drive as disclosed herein instead of the conventional eccentric motors makes it possible to generate the desired exciter frequency immediately and relatively easily. The energy required to produce vibrations is significantly reduced and the noise of the process is greatly decreased. Further, the vibration metal bearings which are located between the vibrating table and the vibrating frame in a conventional vibratory machine and which absorb a large part of the exciter frequency are eliminated in the present invention. Further, since the vibration exciters of the present invention also support the vibrating table, an empty space is formed underneath the mold which can be used for inserting mold cores or recess bodies into the mold.

BRIEF DESCRIPTION OF THE SEVERAL VIEWS OF THE DRAWING

Other objects and advantages of the present invention will be apparent upon reference to the accompanying description when taken in conjunction with the following drawings, which are exemplary, wherein.

DETAILED DESCRIPTION OF THE INVENTION

Proceeding next to the drawings wherein like reference symbols indicate the same parts throughout the various views a specific embodiment and modifications of the present invention will be described in detail.

Figure 1:
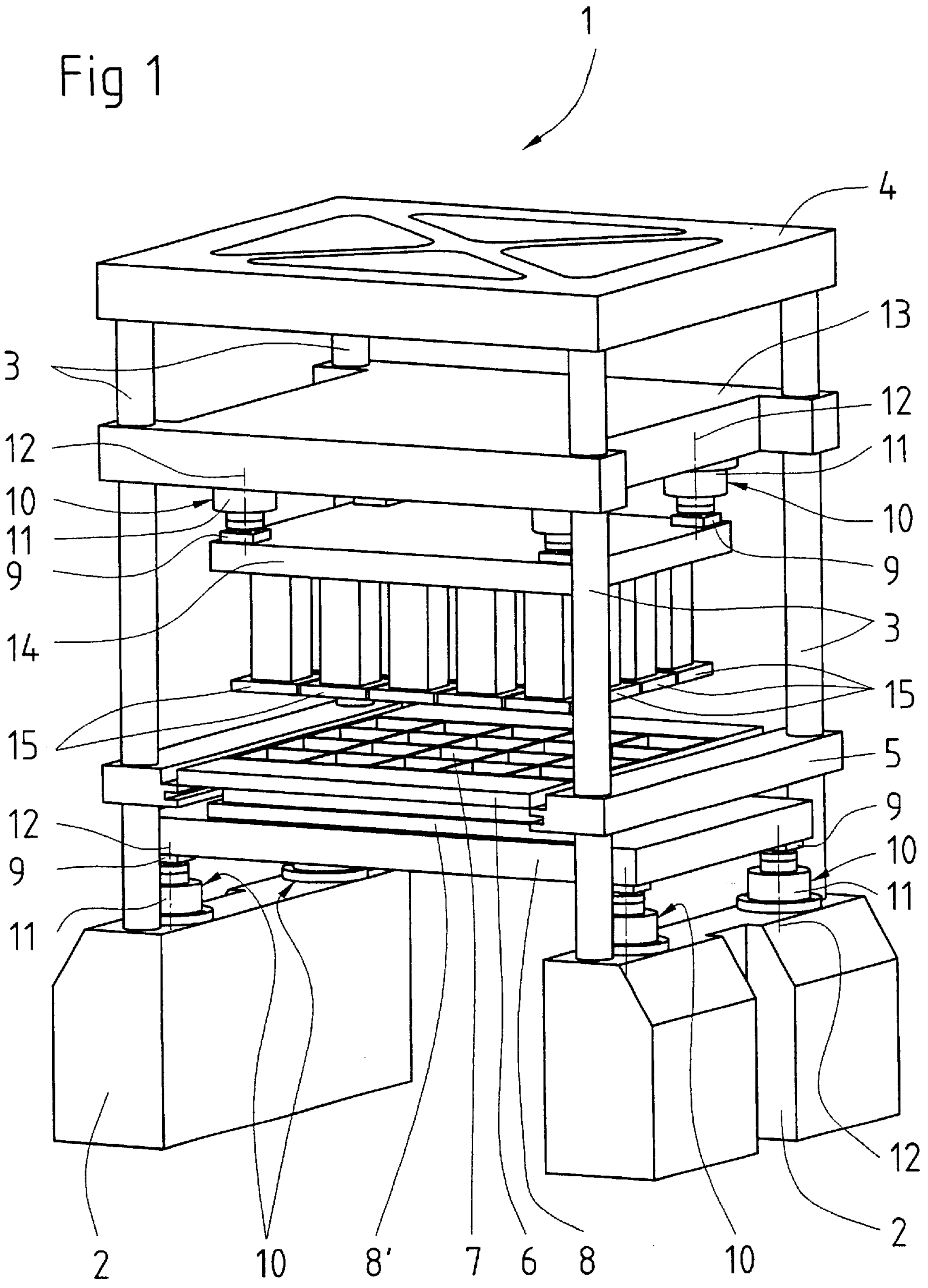
FIG. 1 is an overall perspective view of a molding machine with a vibration drive for a vertically vibrating mold.
Figure 2:
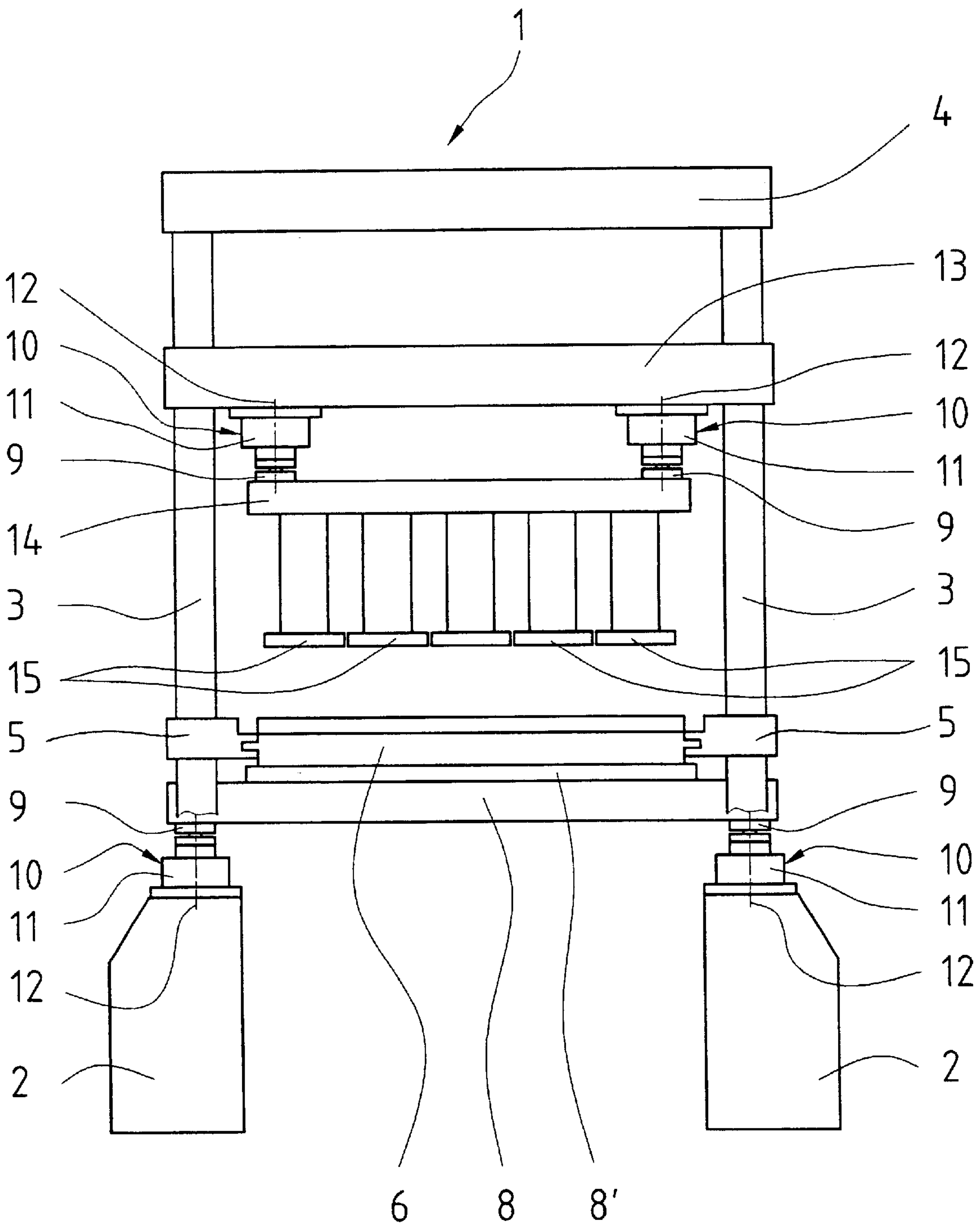
FIG. 2 is a front elevational view of the molding machine shown in FIG. 1.

As may be seen in FIG. 1, there is a molding machine indicated generally at 1 for producing concrete mold bodies and having a machine frame 2 with four vertical guide columns 3 which at their top ends are connected to each other by a plate 4. The mold supporting plate 5 carrying a mold 6 which has mold cavity 7 which are open at their tops and bottoms is supported to move vertically on the guide columns 3. The mold 6 can be moved up and down in the conventional manner by hydraulic cylinders, which are not shown and can be positioned on a vibrating table 8 or a mold board 8' which is positioned on the vibrating table. On the bottom of the rectangular vibrating table 8 there is connected a vibrating member 9 of a piezoelectric ceramic vibration exciter 10 positioned in each of the four corner areas of the vibrating table. The exciter 10 also has a stationary portion 11 which is connected to the machine frame 2. After the mold cavity 7 is filled with a suitable concrete mixture, the vibration exciters 10 are activated by the application of an AC voltage and are caused to vibrate back and forth which motion is transferred to the vibrating table 8 and the mold 6 which is positioned upon it. The vibration exciter 10 has a longitudinal axis 12 which is at the same time the direction of vibration of the vibrating member 9 and this longitudinal axis is aligned vertically so that the vibrating table 8 will oscillate up and down relative to the machine frame 2. The result is a uniform compaction of the concrete mass in each of the mold cavity 7.

Above the mold 6, a force plate 13 is mounted to move vertically on the guide columns 3 and is driven in the conventional manner by lifting elements which may be hydraulic cylinders (not shown in the drawings). On the bottom of the rectangular force plate 13 in each of its four corners, a stationary portion 11 of the vibration exciter 10 is attached and the vibrating member 9 is connected to a holding plate 14. On the bottom of the holding plate 14 there are supported several pressure plates 15 which are correspondingly positioned to each of the individual mold cavities 7 of the mold 6. When the force plate 13 is lowered, the pressure plates 15 are positioned into the mold cavity 7 and press on the concrete masses in each of the cavities. When a voltage is applied to the vibration exciters 10, the pressure plates 15 will vibrate vertically and these vertical vibrations will be transferred to the concrete masses in each of the mold cavities. In this manner, in addition to the shaking motions of the vibration table 8 an additional vibrating action is exerted by the pressure plates 15 on the concrete masses so that a significantly better distribution and compaction of the concrete mass is achieved in each of the mold cavities.

Figure 3:
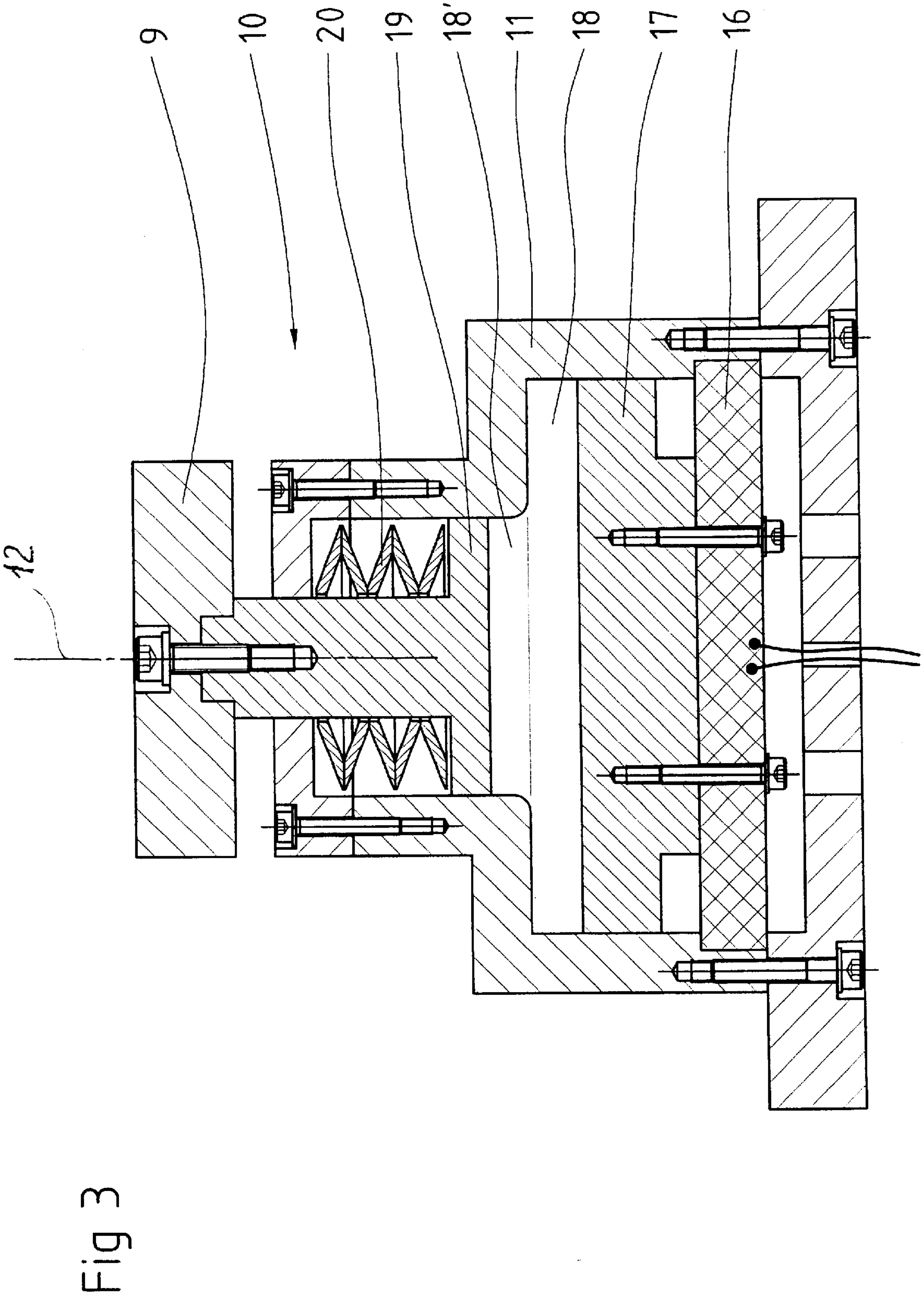
FIG. 3 is a longitudinal cross sectional view through a vibration exciter in an enlarged scale.

As may be seen in FIG. 3, each vibration exciter 10 has a conventional piezoelement 16 in the form of a ceramic plate which is clamped to vibrate freely in the stationary portion 11 of the exciter. This stationary portion 11 is constructed as a housing for the exciter. An electrical AC voltage can be applied to the ceramic plate 16 as shown in FIG. 3. A piston 17 is securely connected, but is interchangeable, to the piezoelement 16 and the piston 17 is guided to move vertically in a cylindrical space 18 within the stationary housing 11. The space 18 is filled with a hydraulic fluid. At the upper portion of the cylindrical space 18, there is a second cylindrical space 18' which has a smaller diameter. In the cylindrical space 18' there is similarly located in the stationary portion or housing 11 a second piston 19 which is also guided to move vertically. The second piston 19 is smaller in diameter than the first piston 17 and is securely connected to the vibrating member 9 of the vibration exciter 10.

Thus, when an AC voltage is applied to the piezoelement 16, pulses of vertical motion are then transmitted by the piston 17 to the hydraulic fluid and to the second piston 19 and thus to the vibrating member 9. These pulses are produced by the expansion of the piezoelement 16. In this manner, a vibrating member 9 and also the vibrating table 8 to which the vibrating member 9 is attached are caused to vibrate vertically. A downward movement of the piston 17 creates a suction force between the piston 17 and the piston 19 and this suction force is supported and assisted by a return spring 20 which acts on the piston 19 in a downward direction.

The pistons 17 and 19 interconnected by a hydraulic transducer enables the magnitude of the vibration or distance of the vibration path of the mold to be increased or decreased with respect to the vibration amplitude of the piezoelement 16, which may be for example, quartz. Since in this embodiment the second piston 19 has a smaller diameter than the piston 17 the magnitude of vibration of the mold is thus increased.

In the event the vibration exciter 10 is operated without hydraulic fluid in the cylindrical spaces 18, 18' there no longer is a transducer component and there is now a solid connection between the two pistons, 17 and 19. The vibratory movements of the piezoelement 16 are transmitted in both directions directly to the vibrating member 9, the return spring 20 can thus be eliminated.

Figure 4:
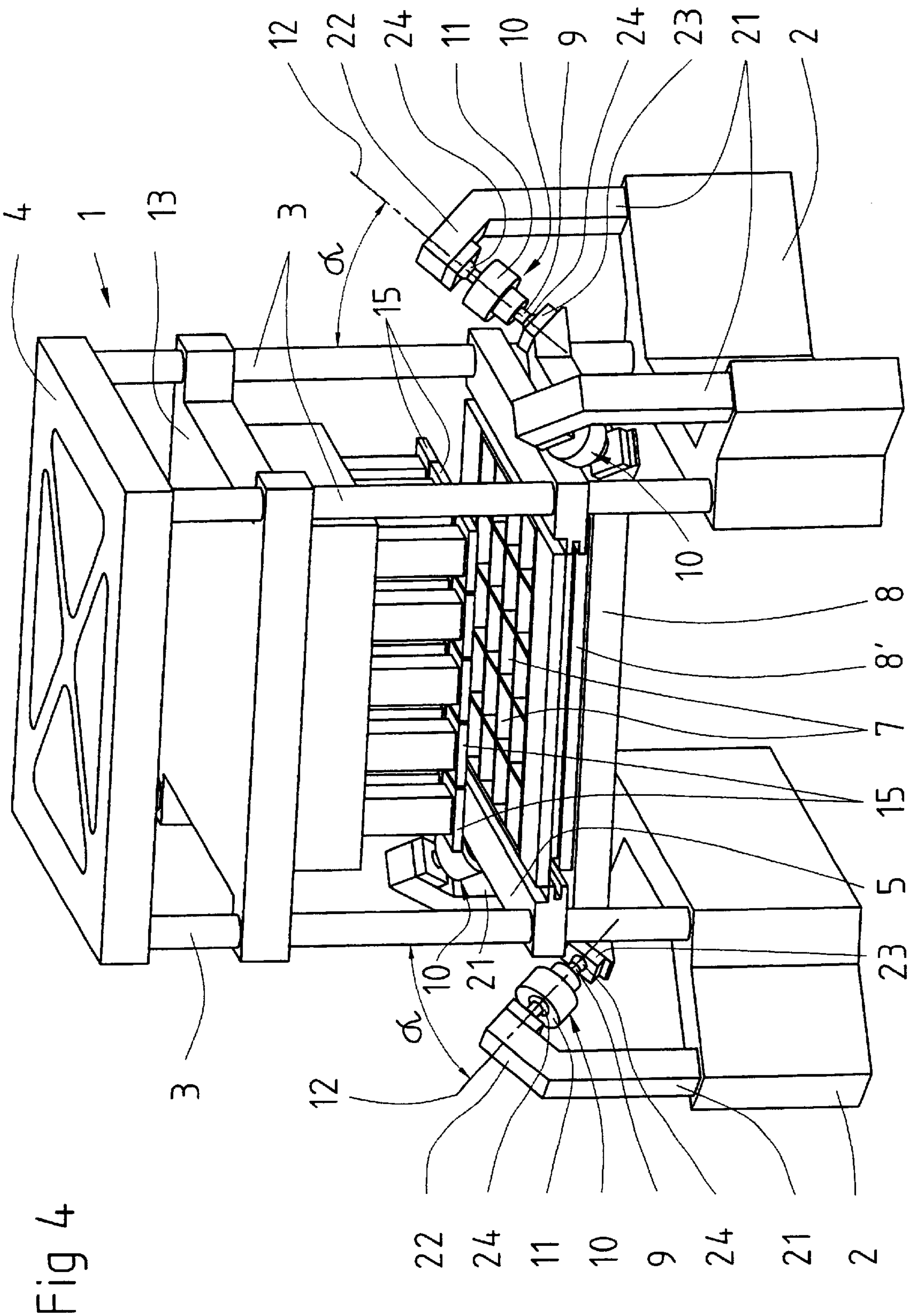
FIG. 4 is an overall perspective view of a molding machine with a vibration drive for a mold which vibrates in three-dimensions.

FIG. 4 shows a modification of the invention in which the vibration exciters 10 are mounted at angles to the horizontal and to the vertical and not vertically as previously described. This is achieved by providing four brackets 21 mounted on the corner areas of the machine frame 2 and each bracket 21 has an inclined upper end 22 to which the stationary portion 11 of the vibration exciter 10 is attached. The vibrating member 9 of the vibration exciter is connected to corresponding receiving plates 23 on the vibrating table 8. The top ends 22 of the brackets 21 are angled to such an extent that when the vibration exciter 10 is attached, its longitudinal axis 12 which is at the same time the direction of vibration of the vibrating member 9 is inclined at an angle of 45 degrees to both the vertical and horizontal. When a voltage is supplied to the vibration exciters 10, the result is a three-dimensional vibration of the vibrating table 8 with a correspondingly intensified vibratory action on the mold 6. This three-dimensional vibration requires that the stationary portions 11 of the vibration exciters 10 are spherically supported on the brackets 21 and the vibrating members 9 are spherically supported on the receiving plates 23 of the vibrating table 8 in ball-and-socket joints 24.

In the modification as shown in FIG. 4, the arrangement of the vibration exciters 10 between the force plate 13 and the pressure plates 15 is eliminated. As a result, the pressure plates 15 are securely connected to the force plate 13.

Figure 5:
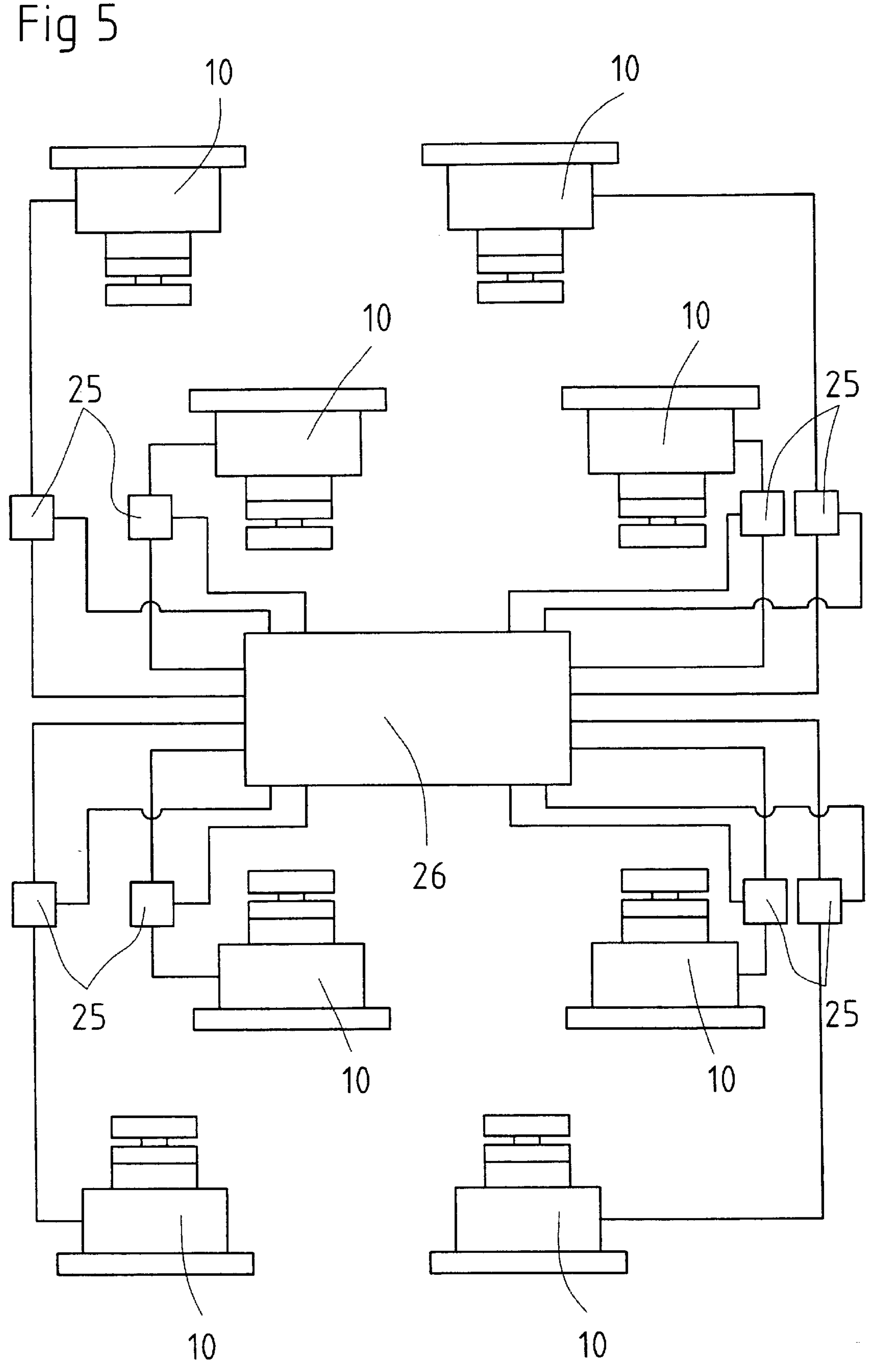
FIG. 5 is a schematic block diagram of the electronic vibration exciter control.

FIG. 5 shows schematically an electronic control of the vibration exciters 10. Frequency controllers 25 which can be activated in a known manner through a microprocessor 26 can be used to change the vibration frequency of the individual vibration exciters 10 which may depend on the type of concrete mix which has been placed in the mold cavity 7. Various other parameters of the vibration drive including the vibration duration, the vibration path, the vibration direction, and the number of vibration exciters which are activated can be automatically controlled by correspondingly preselectable computer programs which are used in a known manner with the microprocessor 26. By way of example, an asymmetrical concrete mold body having an angular cross section is to be molded, one side of the mold cavity will have a greater amount of the concrete mix than on the other side. In order to maintain uniform compaction of the concrete mass, a greater vibration energy must be applied to the side of the mold having the larger portion of concrete. This can be achieved by activating only one or both vibration exciters 10 which are on the side of the larger concrete mass in the embodiment as shown in FIG. 4 and by not operating the other vibration exciters or doing so with a smaller vibration frequency. In this manner, the direction and path of vibrations can be changed as may be desired based upon varying conditions encountered with the concrete mass.

As a further modification, sensors may be attached to the mold to monitor vibration behavior and the resulting vibration data are recorded and then relayed to the microprocessor to control the vibration exciters. This modification provides a real time capable, adaptive control system which can be adjusted to the respective operating conditions by computer control or in a self-regulating manner. The piezoelectronics can thus be used both as sensors and also as actuators.

Figure 6:
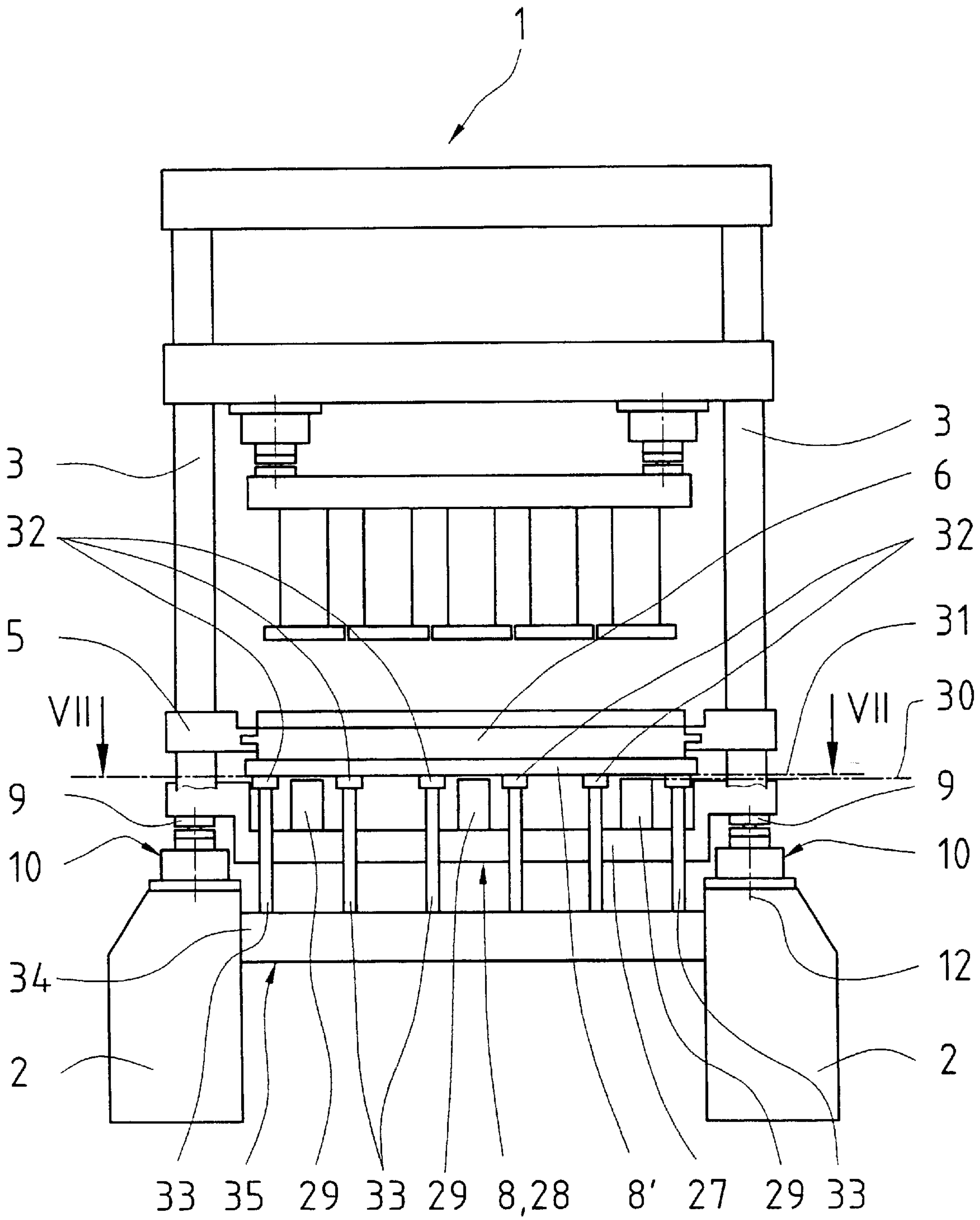
FIG. 6 is a front elevational view of the molding machine including another embodiment of the present invention.
Figure 7:
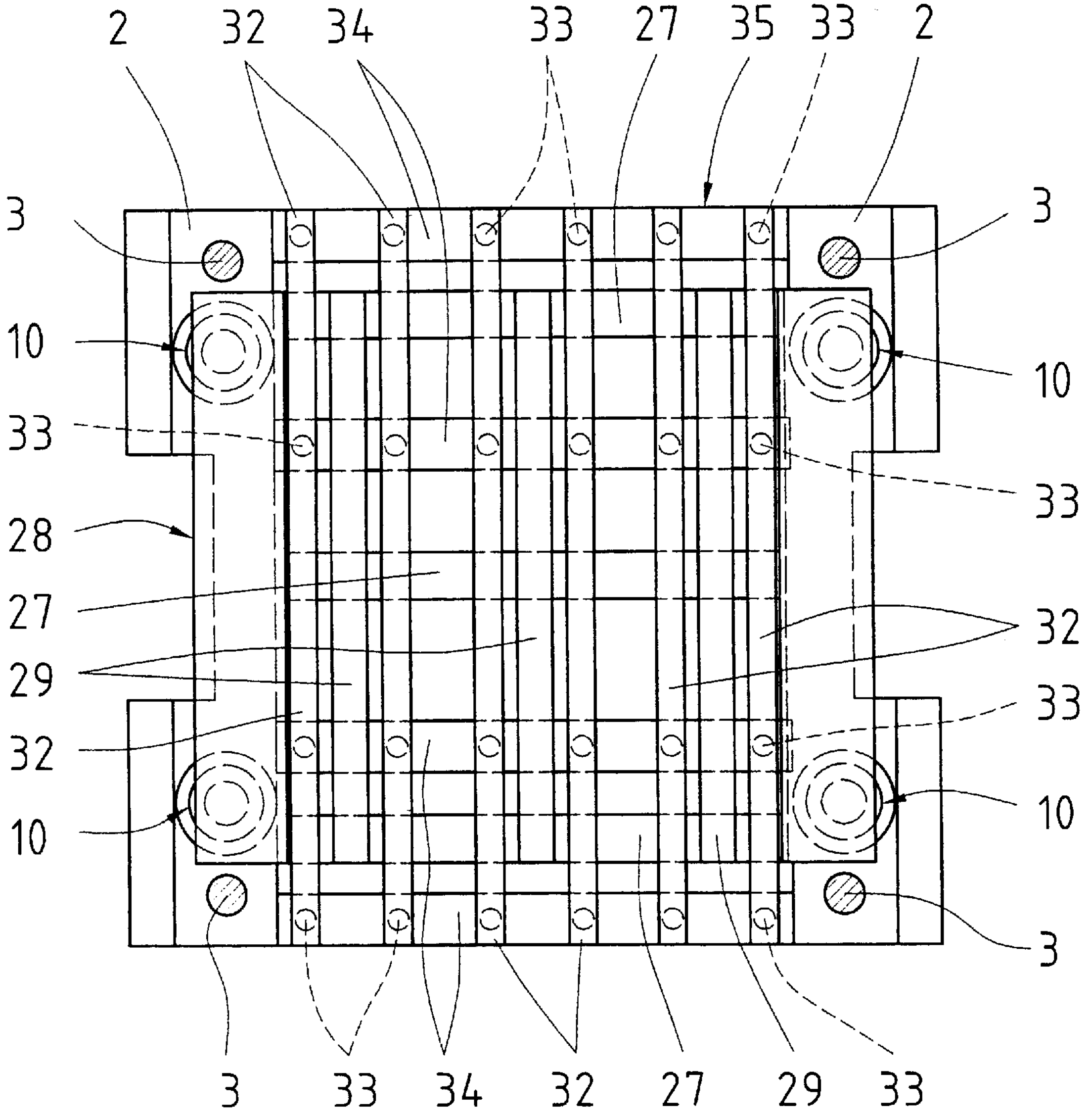
FIG. 7 is a sectional view taken along the line VII—VII in FIG. 6.

In another modification the vibration exciters 10 exert a vibratory action on the mold 6 and the mold board 8' as shown in FIGS. 6 and 7. In this modification, the vibrating table 8 comprises three parallel longitudinal beams 27 which are spaced from each other and which form a vibration frame 28. The vibration frame 28 is securely connected to the vibrating members 9 of the vibration exciters 10 and has three vibrating strips 29 which are attached to the longitudinal beams 27. The vibrating strips 29 are positioned transversely to the longitudinal beams 27 and are spaced from each other. The tops of the vibrating strips 29 form a common vibration plane 30 which is spaced slightly below a support plane 31 for the molding board 8'.

The mold board 8' is supported by six support strips 32 which are spaced from each other and which are parallel to the vibrating strips 29. The support strips 32 are connected by supporting rods 33 to four carrier members 34 of a support frame 35 and which run parallel to the longitudinal beams 27 of the vibration frame 28. The support frame 35 is spaced below the vibration frame 28 and is attached to the machine frame 2. In this structure, there is one vibrating strip 29 between each pair of support strips 32 mounted on support rods 33 which extend downwardly through the vibration frame 28. The longitudinal beams 27 of the vibration frame 28 are located between the carrier members 34 and the support strips 32 which run transversely to the carrier members. The tops of the support strips 32 thus form the support plane 31 for the mold board 8'.

When the vibration drive is actuated, the vibrating strips 29 are moved up and down by the vibration exciters 10 according to the vibration frequency. The vertical distance between the vibration plane 30 and the support plane 31 is such that the vibrating strips 29 in their uppermost positions contact the bottom of the mold board 8' and thus produce the desired vibratory action on the mold 6. In a known manner, the distance between the vibration plane 30 and the support plane 31 can be varied by vertical adjustment of the vibrating strips 29 or in some other known manner. This means that at a larger vibration amplitude the distance between the planes 30 and 31 must also be greater.

The vibration structure as illustrated in FIGS. 6 and 7 has the advantage that the vibratory action of the vibrating strips 29 will result in better compaction of the concrete mix and reduces the vibration time under particular conditions which may include a low proportion of moisture in the concrete mix. Concrete residue which may escape from the mold or may be formed by spills can drop down unhindered through the lattice construction of the vibration frame 28 and the support frame 31. As a result, fouling of the molding machine is significantly reduced.

Thus it can be seen that the present invention provides a vibration drive for a concrete molding machine which can be readily adjusted for a variety of conditions such as composition of the concrete mix.

It will be understood that this invention is susceptible to modification in order to adapt it to different usages and conditions and accordingly, it is desired to comprehend such modifications within this invention as may fall within the scope of the appended claims.

What is claimed is:

1. A vibration drive for a machine for producing shaped concrete bodies from a mold comprising at least one piezoelectric vibration exciter having a stationary portion connected to the frame of the machine and further having a vibrating member connected to a vibrating table of the machine, a piezo element in said vibration exciter and mounted to vibrate freely in said stationary portion, and means for connecting said piezo element to said vibrating member.

2. A vibration drive as claimed in claim 1 wherein said vibrating table has four corner portions, there being a said piezoelectric vibration exciter in each of said corner portions and disposed to vibrate vertically.

3. A vibration drive as claimed in claim 1 wherein said connecting means comprises a force translator.

4. A vibration drive as claimed in claim 1 wherein said stationary portion comprises a housing, a first piston in said housing connected to said piezo element, a second piston in said housing spaced from said first piston connected to said vibrating member and hydraulic fluid within said housing between said first and second pistons to define a driving connection there between.

5. A vibration drive as claimed in claim 4 and further comprising spring means for returning said second piston toward said first piston.

6. A vibration drive as claimed in claim 2 wherein each of said exciters has a longitudinal axis and vibrates along said axis, each of said exciters mounted such that its longitudinal axis is inclined at an angle to the vertical.

7. A vibration drive as claimed in claim 6 wherein said angle is 45 degrees.

8. A vibration drive as claimed in claim 6 and further comprising a spherical bearing connecting each of said exciters to the vibrating table and to the frame.

9. A vibration drive as claimed in claim 8 wherein said spherical bearing each comprises a ball and socket joint.

10. An apparatus for the production of shaped concrete bodies from a mold comprising a frame, a vibrating table for supporting at least one mold thereon, and at least one piezoelectric vibration exciter having a stationary portion connected to the frame of the apparatus and further having a vibrating member connected to the vibrating table of the apparatus.

11. An apparatus as claimed in claim 10 and further comprising at least one pressure plate corresponding to the cavity of a mold disposed above said vibrating table, means above said pressure plate for vertically moving said pressure plate, at least one or more piezoelectric vibration exciters connected between said means for vertically moving and said pressure plate.

12. An apparatus as claimed in claim 10 and further comprising means for varying parameters of the vibration drive consisting of vibration frequency, duration, direction, path of vibration and the number of vibration exciters which are activated.

13. An apparatus as claimed in claim 12 and further comprising a programmable microprocessor for adjusting the parameters of the vibration drive.

14. An apparatus as claimed in claim 13 and further comprising means for controlling said vibration exciters individually or in groups.

15. An apparatus as claimed in claim 10 wherein said vibrating table has one or more openings there through, one or more supporting rods extending freely through said openings without contact with said vibrating able, said supporting rods having first top ends which define a support plane for a mold board.

16. An apparatus as claimed in claim 15 and further comprising a support frame fixedly attached to the frame of the apparatus, said support rods mounted on said support frame.

17. An apparatus as claimed in claim 16 and comprising one or more vibrating bars on said vibrating table each having a top surface and said bar top surfaces defining a vibrating plane spaced below said support plane.

18. An apparatus as claimed in claim 17 and further comprising means for adjusting the height of said support plane with respect to the vibration frequency of the vibrating table.

19. An apparatus as claimed in claim 10 wherein said vibrating table comprises a plurality of spaced parallel beams and a plurality of spaced parallel vibrating bars mounted on said beams and perpendicular thereto, said vibrating bars having top surfaces defining a vibrating plane, a support frame fixedly attached to the frame of the apparatus, a plurality of spaced support rods upstanding from said support frame between said vibrating bars, and a plurality of support strips parallel to and between said vibrating bars and attached to the top ends of said support rods to define a support plane spaced above said vibrating plane.

* * * * *

UNITED STATES PATENT AND TRADEMARK OFFICE

CERTIFICATE OF CORRECTION

PATENT NO. : 6,342,750 B1
DATED : January 29, 2002
INVENTOR(S) : Rudolf Braungardt and Erwin Schmucker It is certified that error appears in the above-identified patent and that said Letters Patent is hereby corrected as shown below:

Title page,
Item [30], should read:

-- [30] Foreign Application Priority Data

May 9, 1999 (DE) 199 21 145.0 --

Signed and Sealed this

Tenth Day of December, 2002

JAMES E. ROGAN
*Director of the United States Patent and Trademark Office*